(12) United States Patent
Divakaruni et al.

(10) Patent No.: US 11,149,810 B2
(45) Date of Patent: Oct. 19, 2021

(54) VEHICLE DISC BRAKE ASSEMBLY HAVING A BRAKE PAD WITH A SHIM MECHANICALLY RESTRAINED FROM LATERAL MOVEMENT

(71) Applicant: ZF Active Safety US Inc., Livonia, MI (US)

(72) Inventors: Saikiran Divakaruni, Rochester Hills, MI (US); Peter Kula, Howell, MI (US)

(73) Assignee: ZF Active Safety US Inc., Livonia, MI (US)

( * ) Notice: Subject to any disclaimer, the term of this patent is extended or adjusted under 35 U.S.C. 154(b) by 166 days.

(21) Appl. No.: 16/547,156

(22) Filed: Aug. 21, 2019

(65) Prior Publication Data

US 2021/0054892 A1    Feb. 25, 2021

(51) Int. Cl.
| | | |
|---|---|---|
| *F16D 65/095* | (2006.01) | |
| *B60T 13/575* | (2006.01) | |
| *F16D 55/226* | (2006.01) | |
| *F16D 65/02* | (2006.01) | |
| *F16D 69/04* | (2006.01) | |

(52) U.S. Cl.
CPC .......... *F16D 65/095* (2013.01); *B60T 13/575* (2013.01); *F16D 55/226* (2013.01); *F16D 2065/026* (2013.01); *F16D 2069/0466* (2013.01)

(58) Field of Classification Search
CPC .... B60T 13/575; F16D 55/226; F16D 65/092; F16D 65/095; F16D 65/0006; F16D 2065/026; F16D 2069/004; F16D 2069/0466; F16D 2069/0483; F16D 2069/0491; F16D 2069/0441; F16D 2069/0408; F16D 2069/0433; F16D 69/0408; B61H 5/00
USPC ............. 188/73.32, 250 G, 250 B; 29/527.5; 164/11, 44, 245
See application file for complete search history.

(56) References Cited

U.S. PATENT DOCUMENTS

| | | | |
|---|---|---|---|
| 6,279,222 B1* | 8/2001 | Bunker | F16D 65/092 29/527.5 |
| 8,844,683 B2 | 9/2014 | Sternal et al. | |
| 2007/0295567 A1* | 12/2007 | Adams | F16D 65/0006 188/218 XL |
| 2013/0277160 A1* | 10/2013 | Dreher | F16D 65/092 188/250 B |
| 2016/0195147 A1* | 7/2016 | Carney | F16D 65/092 188/250 B |

(Continued)

FOREIGN PATENT DOCUMENTS

DE    102016001311    *   8/2016

*Primary Examiner* — Robert A. Siconolfi
*Assistant Examiner* — San M Aung
(74) *Attorney, Agent, or Firm* — Robert James Harwood

(57) ABSTRACT

A brake pad for a vehicle disc brake assembly has a backing plate, a shim, and an adhesive bond between the backing plate and the shim that retains the shim on the backing plate. The backing plate is configured to support a brake lining and has a recessed portion with transverse first and second surfaces. The first surface is a bottom surface of the recessed portion and the second surface is a perimeter surface that defines a perimeter of the bottom surface. The shim has a face surface that is also transverse to the bottom surface. The face surface is configured to engage with the perimeter surface to mechanically restrain the shim in the recessed portion from lateral displacement.

18 Claims, 16 Drawing Sheets

(56) References Cited

U.S. PATENT DOCUMENTS

| | | |
|---|---|---|
| 2018/0087589 A1 | 3/2018 | Gerber et al. |
| 2018/0223928 A1 | 8/2018 | Miller et al. |
| 2018/0238406 A1 | 8/2018 | Gerber et al. |
| 2019/0063523 A1* | 2/2019 | Signoriello ......... F16D 65/0006 |

* cited by examiner

VEHICLE DISC BRAKE ASSEMBLY HAVING A BRAKE PAD WITH A SHIM MECHANICALLY RESTRAINED FROM LATERAL MOVEMENT

BACKGROUND OF INVENTION

This invention relates in general to vehicle disc brake assemblies and in particular to an improved brake pad for such a vehicle disc brake assembly.

A typical disc brake assembly for a vehicle includes a brake disc which is secured to a wheel of the vehicle for rotation therewith and non-rotating brake linings that are operable between non-braking and braking positions. Each of the brake linings is supported on a brake pad. In the non-braking position, the brake linings do not slow rotation of the brake disc and vehicle wheel. In the braking position, the brake linings are in frictional engagement with the brake disc to slow rotation of the brake disc and vehicle wheel.

Each of the brake pads include a brake lining supported by a backing plate. Each of the brake pads also typically include a shim or other noise isolator secured to the backing plate on a side of the backing plate opposite the brake lining. The shim provides damping to reduce noise, vibration, or harshness that may occur during operation of the brake disc. The shims may be secured to backing plates by an adhesive bond.

Operation of the disc brake assembly results in lateral loading of the shim and an increased temperature for the shim. The loading and increased temperature may result in the adhesive of the bond becoming viscous. The adhesive becoming viscous reduces a strength of the adhesive bond. When the strength of the adhesive bond is reduced, the shim may laterally shift—i.e., shift perpendicular to a longitudinal direction of displacement for the brake pad—on the backing plate and reduce an effectiveness of the shim in reducing noise, vibration, and harshness. Thus, it would be desirable to have a brake pad with a shim that does not laterally shift under high loads and temperatures.

Furthermore, stability of the brake pads is reduced when the brake pads have large brake linings under high loading. A thickness of the backing plates may be increased to improve the stability of the brake pads. However, increasing the thickness of the backing plates also increases a cost of the backing plates and brake pads. Thus, it would also be desirable to have a brake pad with increased stability for large brake linings under high loading without increasing a thickness of the backing plate.

SUMMARY OF INVENTION

This invention relates to brake pads for use with vehicle disc brake assemblies, wherein the brake pads have a shim mechanically restrained from lateral shifting.

According to one embodiment, a brake pad for a vehicle disc brake assembly may comprise, individually and/or in combination, one or more of the following features: a backing plate, a shim, and an adhesive bond between the backing plate and the shim that retains the shim on the backing plate. The backing plate is configured to support a brake lining and has a recessed portion with transverse first and second surfaces. The first surface is a bottom surface of the recessed portion and the second surface is a perimeter surface that defines a perimeter of the bottom surface. The shim has a face surface that is transverse to the bottom surface. The face surface is configured to engage with the perimeter surface to mechanically restrain the shim in the recessed portion.

According to this embodiment, the brake pad may further comprise a third surface of the backing plate into which the recessed portion extends and a depth between the first and third surfaces. The depth is perpendicular to the first surface and greater than zero for all of an area where the shim contacts the backing plate.

According to this embodiment, the brake pad may further comprise a third surface of the backing plate into which the recessed portion extends and a depth between the first and third surfaces. The depth is perpendicular to the first surface and greater than zero for less than all of an area where the shim contacts the backing plate.

According to this embodiment, the brake pad may further comprise a third surface of the shim and the face surface may be a lip extending from the third surface such that the shim has a second recessed portion facing the backing plate. The brake pad may be configured to be displaced along a first axis and the lip may define an extent of contact between the shim and the backing plate along a second axis that is perpendicular to the axis. The lip may have inner and outer surfaces. The face surface may be the outer surface of the lip and the perimeter surface may be an outer perimeter of the recessed portion. Alternatively, the face surface may be the inner surface and the perimeter surface may be an inner perimeter of the recessed portion. The lip and recessed portion may each have at least one notch. The at least one notch in the lip defines a plurality of lip portions and the at least one notch in the recessed portion defines a plurality of notch portions. The brake pad may further comprise a rib on a face of the backing plate opposite the recessed portion. The rib may have at least one notch. The at least one notch in the rib defines a plurality of rib portions.

According to this embodiment, the face surface may engage with the second surface when the face surface displaces towards the perimeter of the bottom surface during operation of the disc brake assembly.

According to this embodiment, the shim may be formed from a damping material.

According to another embodiment, a brake pad for a vehicle disc brake assembly may comprise, individually and/or in combination, one or more of the following features: a backing plate, a shim of damping material, and an adhesive bond between the backing plate and the shim that retains the shim on the backing plate. The backing plate is configured to support a brake lining and be displaced along a first axis. The backing plate has a recessed portion with a bottom surface and a second surface that defines a perimeter of the bottom surface. The shim has a face surface that is transverse to the bottom surface. The face surface engages with the second surface when the shim displaces along a second axis perpendicular to the first axis.

According to this embodiment, the brake pad may further comprise a third surface of the backing plate into which the recessed portion extends, a portion of the backing plate that is coplanar with the third surface, a fourth surface of the shim facing the third surface, and a lip extending from the fourth surface. The bottom surface extends circumferentially around the coplanar portion. The face surface is on the lip.

According to this embodiment, the brake pad may further comprise a depth of the recessed portion. The second surface may define an outer perimeter of the recessed portion. The depth within the outer perimeter is greater than zero.

According to this embodiment, the brake pad may further comprise inner and outer perimeters of the recessed portion, a first depth of the recessed portion, and a second depth within the inner perimeter. The second surface is the outer perimeter. The first depth is greater than zero between the inner perimeter and the outer perimeter and the second depth is zero.

According to yet another embodiment, a brake pad for a vehicle disc brake assembly may comprise, individually and/or in combination, one or more of the following features: a backing plate, a shim of damping material, and an adhesive bond between the backing plate and the shim that secures the shim to the recessed portion. The backing plate is configured to support a brake lining and be displaced along a first axis. The backing plate has a recessed portion with a bottom surface perpendicular to the first axis and a perimeter surface transverse to the bottom surface. At least a portion of the shim is in the recessed portion and the shim has a face surface that is complementary to the perimeter surface. The face surface is configured to engage with the perimeter surface and mechanically restrain the shim on the backing plate when the shim is subjected to a force along a second axis perpendicular to the first axis.

According to this embodiment, the recessed portion may be a groove and the portion of the shim in the recessed portion may be a lip extending from the shim and having the face surface.

According to this embodiment, the recessed portion may be a pocket and a full extent of the shim along the second axis is in the pocket.

An advantage of an embodiment is reduced lateral shifting of a shim on a brake pad under high loads and temperatures. An additional advantage of an embodiment is increased stability of a brake pad with a large brake lining under high loading. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
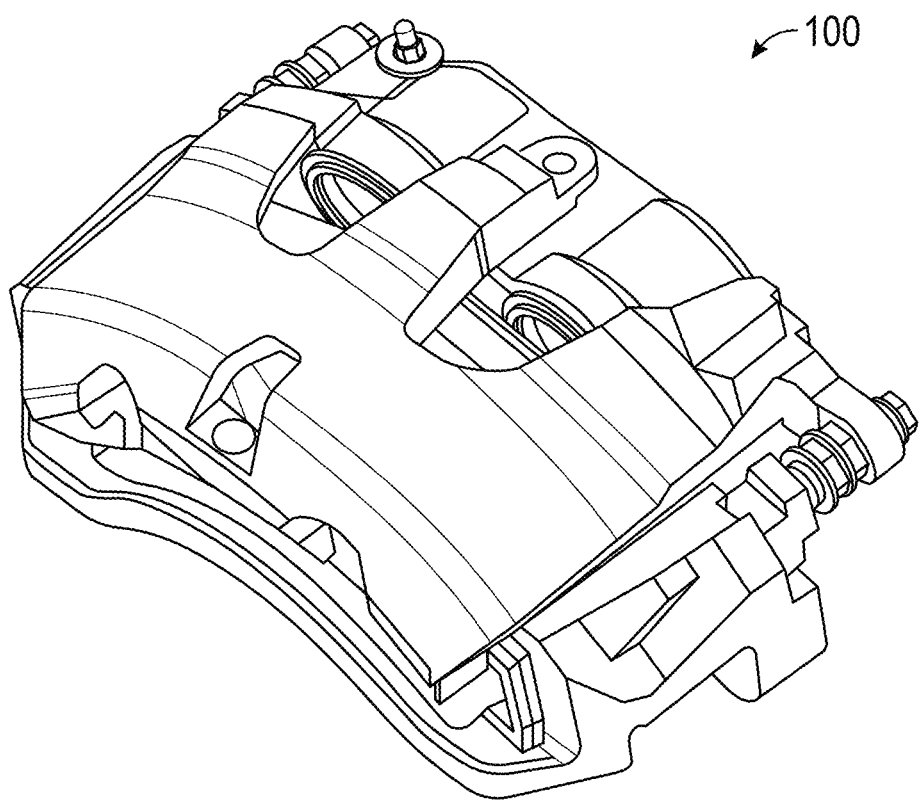
FIG. 1 is an elevation view of a vehicle disc brake assembly having a first embodiment of a brake pad in accordance with the present invention.

Referring now to FIG. 1 there is illustrated a vehicle disc brake assembly, indicated generally at 100. The disc brake assembly 100 is for applying braking friction to a brake disc (not shown) of a vehicle (also not shown). The general structure and operation of the disc brake assembly 100 is well known to those skilled in the art. For example, the disc brake assembly 100 may be as disclosed by U.S. Patent Application Publication No. 2018/0223928 to Miller et al., U.S. Patent Application Publication No. 2018/0238406 to Gerber et al., U.S. Pat. No. 8,844,683 to Sternal et al., or U.S. Patent Publication No. 2018/0087589 to Gerber et al., the disclosures of all of which are hereby incorporated by reference in entirety herein. Thus, only those portions of the prior art disc brake assembly 10 that are necessary for a full understanding of this invention will be explained and illustrated.

The disc brake assembly 100 has outer and inner brake pads, respectively indicated generally at 102A and 102B (shown in FIG. 2), in accordance with a first embodiment of the present invention. Discussion of one of the outer or inner brake pads 102A or 102B, respectively, including elements, components, or structure thereof, applies to the other of the outer or inner brake pads 102A or 102B, respectively. The outer and inner brake pads 102A and 102B, respectively, are not limited to use with the specific disc brake assembly 100 described herein. Indeed, the present invention is not limited to the context of any inner, outer, or otherwise spatially identified brake pad about which it is discussed. As a non-limiting example, while the invention may be discussed with regard to an outer brake pad—e.g., the outer brake pad 102A—the invention is not limited to outer brake pads and may be utilized with any suitable brake pad.

Figure 2:
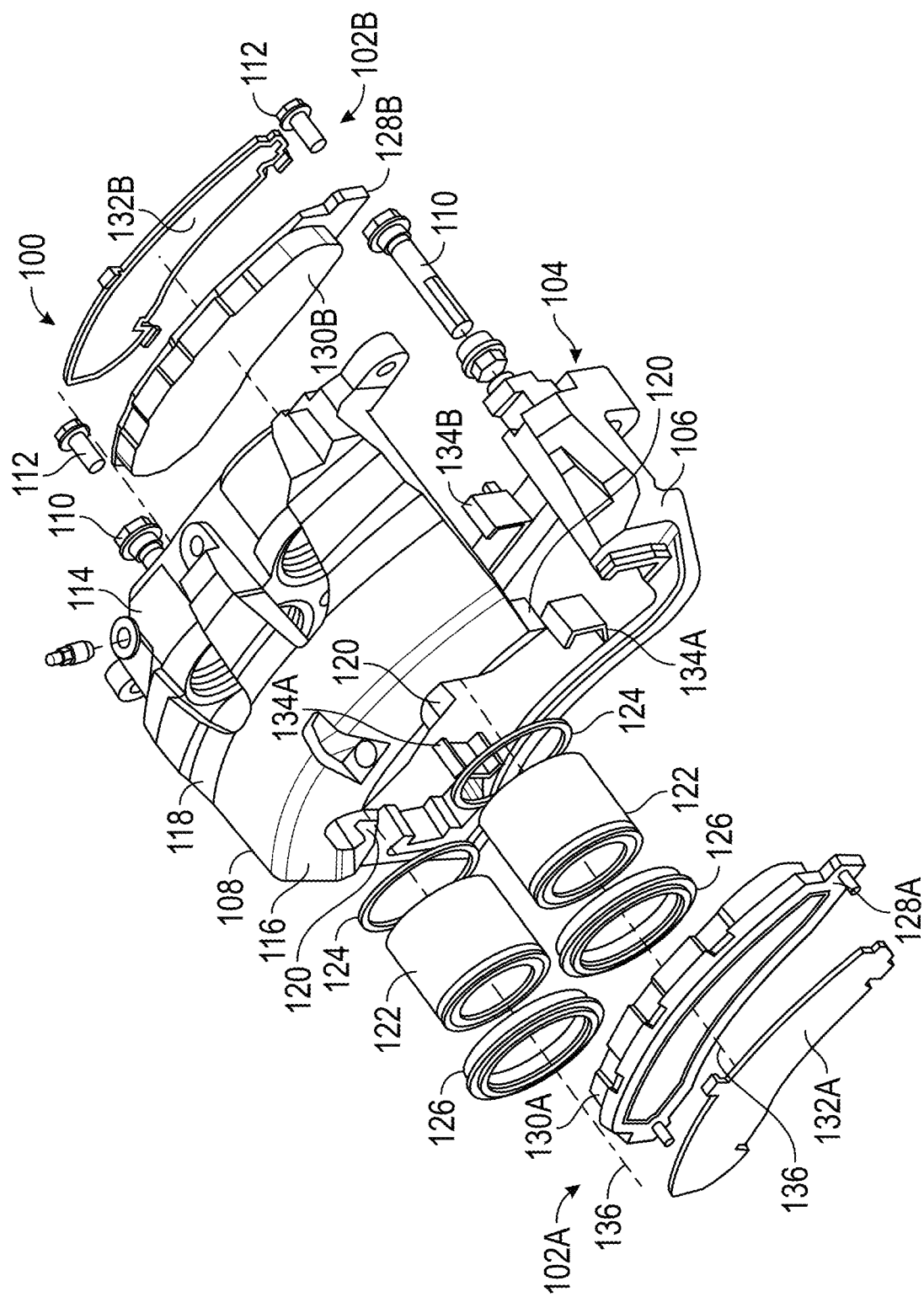
FIG. 2 is an exploded view of the vehicle disc brake assembly of FIG. 1.

FIG. 2 illustrates an exploded view of the disc brake assembly 100 and shows the outer and inner brake pads 102A and 102B, respectively. The disc brake assembly 100 includes a caliper assembly, indicated generally at 104. In turn, the caliper assembly 104 includes an anchor bracket 106 and a caliper 108. The caliper 108 is slidably supported on the anchor bracket 106 by pins 110. The anchor bracket 106 is, in turn, secured to a stationary component of the vehicle, such as for example an axle flange (not shown) or a steering knuckle (also not shown) by a pair of mounting bolts 112. The caliper 108 includes an inner portion 114 and an outer portion 116 connected by a bridge section 118. The caliper outer portion 116 includes fingers 120. A pair of hydraulic actuators, namely pistons 122, connect to hydraulic ports (not shown) of the caliper inner portion 114.

Seals 124 are disposed between the pistons 122 and their respective hydraulic ports for creating a sealed surface between the hydraulic ports and the pistons 122. Dust seals 126 are coupled to exposed ends of the pistons 122. The dust seals 126 prevent dust and other contaminants from forming on the end portions of the pistons 122.

The outer brake pad 102A is supported by the anchor bracket 106 and includes an outer backing plate 128A, an outer brake lining 130A, and an outer shim or noise insulator 132A. The outer brake lining 130A is secured or otherwise supported on the outer brake pad 102A. Clips 134A mate with end portions of the outer backing plate 128A. The clips 134A assist in retaining the outer backing plate 128A to the anchor bracket 106 in addition to preventing rattling of the outer backing plate 128A.

The inner brake pad 102B is also supported by the anchor bracket 106 and includes an inner backing plate 128B, an inner brake lining 130B, and an inner shim or noise insulator 132B. The inner brake lining 130B is secured or otherwise supported on the inner brake pad 102B. Clips 134B mate with end portions of the inner backing plate 128B. The clips 134B assist in retaining the inner backing plate 128B to the anchor bracket 106 in addition to preventing rattling of the inner backing plate 128B.

In a non-braking or release position, the outer and inner brake linings 130A and 130B, respectively, are disposed with a small air clearance on both sides of the brake disc. As a result, no significant braking friction occurs from the outer and inner brake linings 130A and 130B, respectively, on the brake disc.

When braking is desired for the vehicle having the disc brake assembly 100, the disc brake assembly 100 is hydraulically actuated. As non-limiting examples, the disc brake assembly 100 may be hydraulically actuated by a driver via a brake pedal or via a drive assistance system. When the disc brake assembly 100 is hydraulically actuated, hydraulic fluid is pressurized (by a suitable means known to those skilled in the art) such that the pistons 122 are displaced longitudinally along axes 136 and against the inner brake pad 102B. As a consequence, and as is known to those skilled in the art, the inner brake lining 130B is pressed along the axes 136 and onto the brake disc by the pistons 122. At the same time, a corresponding displacement of the caliper 108 on an opposite side of the brake disc causes the outer brake lining 130A to be drawn along the axes 136 and against the opposite side of the brake disc. When drawn against the brake disc, the outer and inner brake linings 130A and 130B, respectively, are in a braking position and apply braking friction to the brake disc. The braking friction slows or stops rotation of the brake disc and, as a result, the vehicle is braked.

Figure 7:
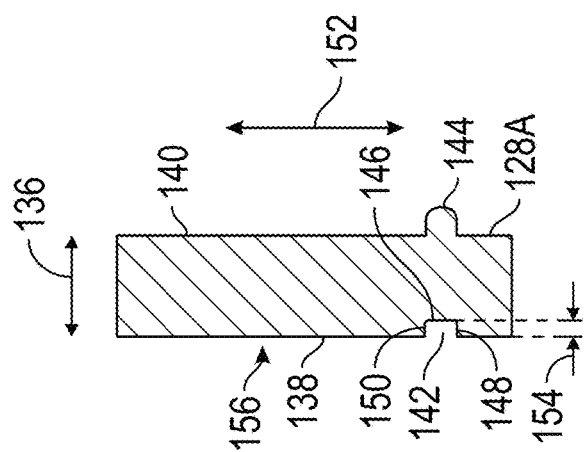
FIG. 7 is a section view taken along line 7-7 of FIG. 3.
Figure 6:
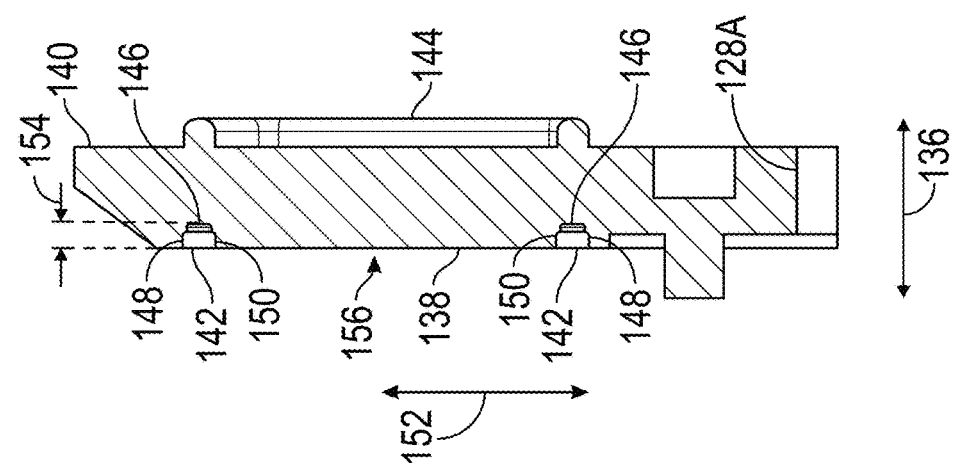
FIG. 6 is a section view taken along line 6-6 of FIG. 3.
Figure 5:
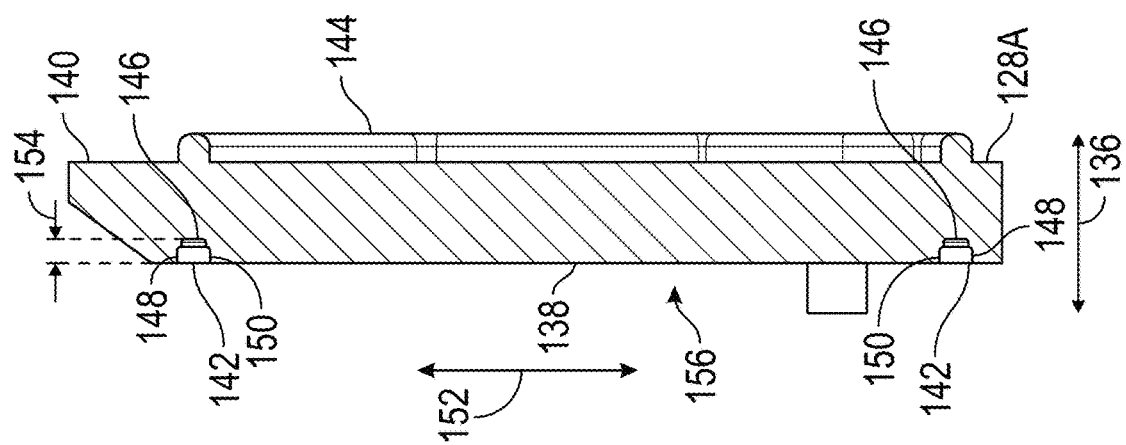
FIG. 5 is a section view taken along line 5-5 of FIG. 3.
Figure 8:
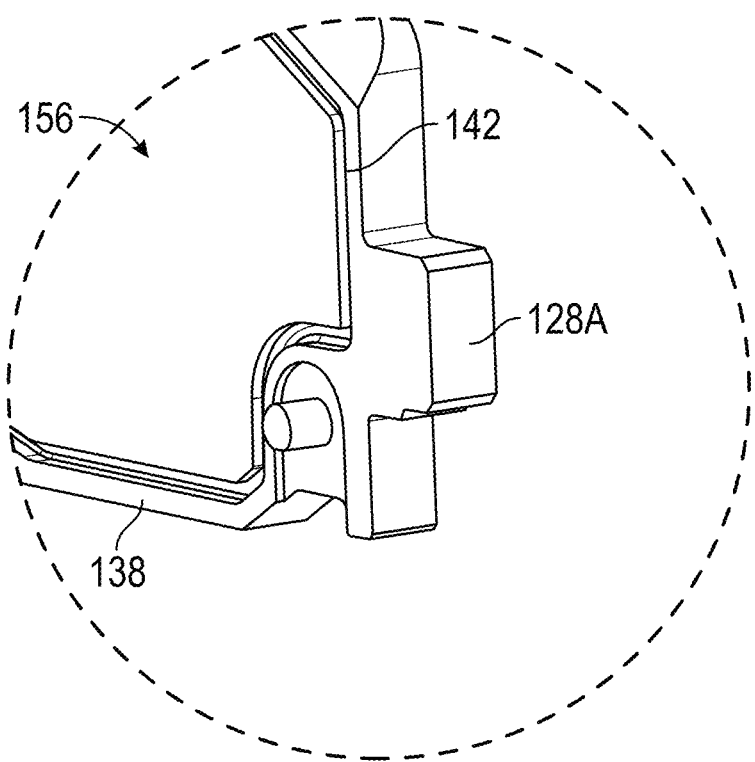
FIG. 8 is a partial perspective view of the backing plate of FIG. 3.

Referring now to FIGS. 3-8, the outer backing plate 128A is illustrated in detail. The outer backing plate 128A has opposite first and second faces 138 and 140, respectively, extending transversely to the axis 136. Extending into the first backing plate face 138 is a recessed portion 142. As shown in FIGS. 3 and 5-8, the recessed portion 142 is a groove. Alternatively, the recessed portion 142 may be other than the groove illustrated. Extending outward from the second backing plate face 140 is a rib 144. The rib 144 increases stiffness of the outer backing plate 128A. As best shown in FIGS. 5-7, the rib 144 is preferably positioned to align with the groove 142. Alternatively, the rib 144 may be positioned other than to align with the groove 142 or the rib 144 may be omitted from the second backing plate face 140.

Figure 3:
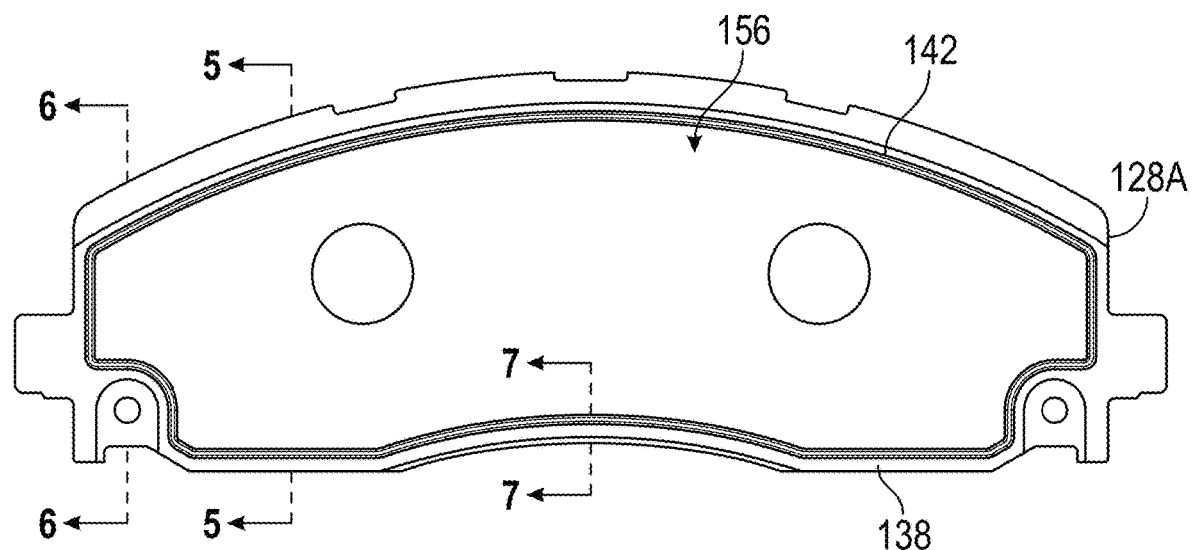
FIG. 3 is a first elevation view of a backing plate of the brake pad of FIG. 1.
Figure 4:
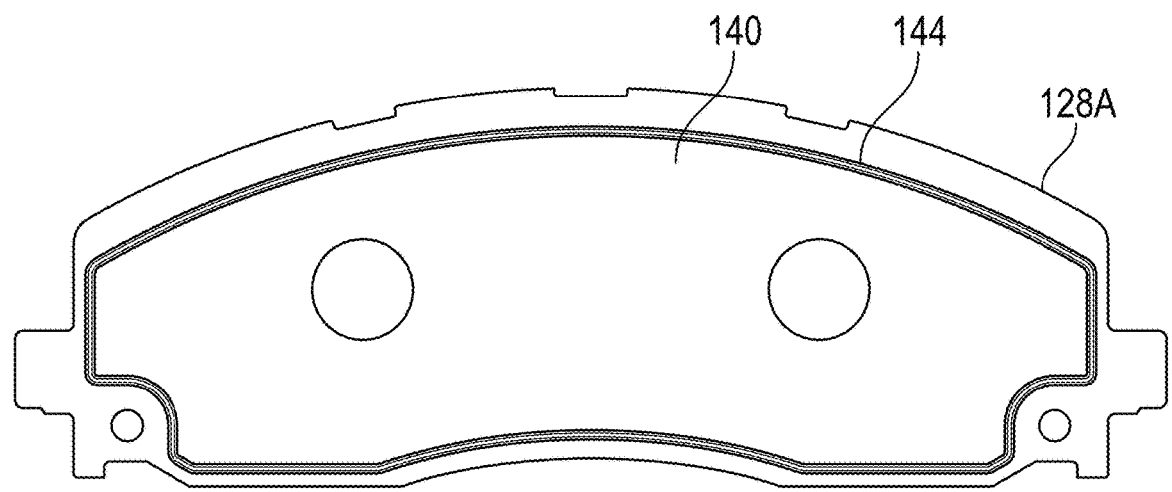
FIG. 4 is a second elevation view of the backing plate of FIG. 3.

The groove 142 extends circumferentially about the first backing plate face 138—i.e., the groove 142 extends 360° on the first backing plate face 138 (best shown in FIG. 3). Similarly, the rib 144 extends circumferentially—i.e., 360°—about the second backing plate face 140 (best shown in FIG. 4). Preferably, the groove 142 may be produced by a stamping operation. The stamping operation that produces the groove 142 may be performed so as to also result in the rib 144 extending from the second backing plate face 140. Alternatively, the groove 142 and/or rib 144 may be produced other than by a stamping operation.

Referring specifically to FIGS. 5-7, the groove 142 has a bottom surface 146, an outer perimeter surface 148, and an inner perimeter surface 150. The outer and inner groove perimeter surfaces 148 and 150, respectively, define outer and inner perimeters or other extents, respectively, of the groove bottom surface 146 along a second axis 152 that is perpendicular to the axis 136. Preferably, the groove bottom surface 146 is a plane containing the second axis 152.

The outer and inner groove perimeter surfaces 148 and 150, respectively, are transverse to the groove bottom surface 146. Preferably, the outer and inner groove perimeter surfaces 148 and 150, respectively, are parallel to the axis 136 and the groove bottom surface 146 is perpendicular to the axis 136. As illustrated, the groove 142 preferably has fillets at intersections of the groove bottom surface 146, the outer groove perimeter surface 148, and the inner groove perimeter surface 150, although such is not necessary.

The groove 142 has a depth 154 along the axis 136. Preferably, the groove depth 154 is perpendicular to the first backing plate face 138. The groove depth 154 is measured from the first backing plate face 138. As a non-limiting example, the groove depth 154 may be between 0.5-5.0 millimeters. As such, the outer backing plate 128A and the groove 142 have a lesser combined thickness than the outer backing plate 128A alone.

Preferably, the groove depth 154 is constant for an entirety of the groove 142. Alternatively, the groove depth 154 may vary. A portion of the first backing plate face 138 is fully surrounded by the groove 142 such that the portion is an "island" or panel inside the groove 142. Preferably, the backing plate contact area 156 is coplanar with the first backing plate face 138 outside of the groove 142. The backing plate contact area 156 has zero depth into the outer backing plate 128A. As will be discussed, the portion of the first backing plate face 138 surrounded by the groove 142 is a contact area, indicated generally at 156, for securing the outer shim 132A to the outer backing plate 128A. The outer backing plate 128A has a groove depth 154 of greater than zero for less than all of the backing plate contact area 156.

Figure 9:
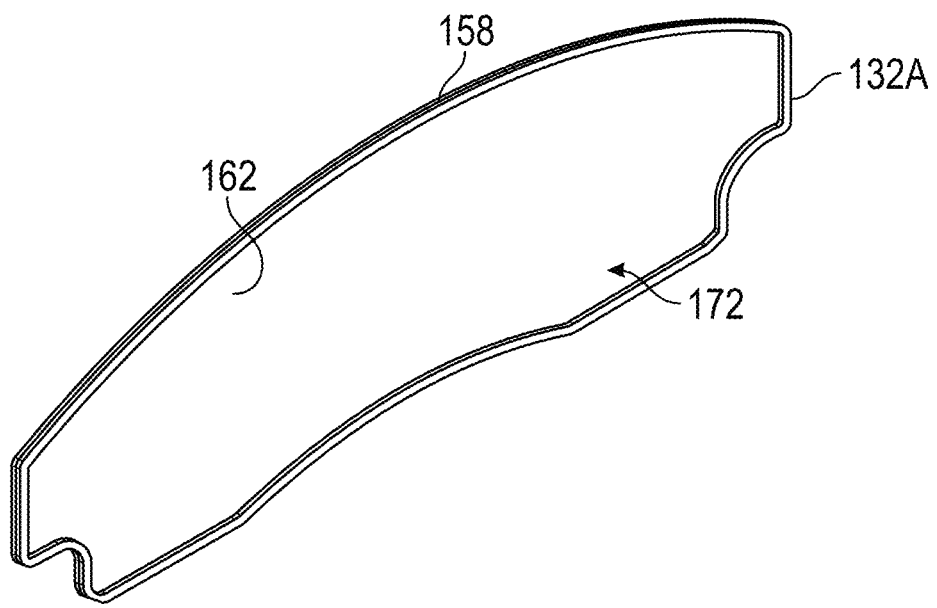
FIG. 9 is a perspective view of a shim of the brake pad of FIG. 1.
Figure 10:
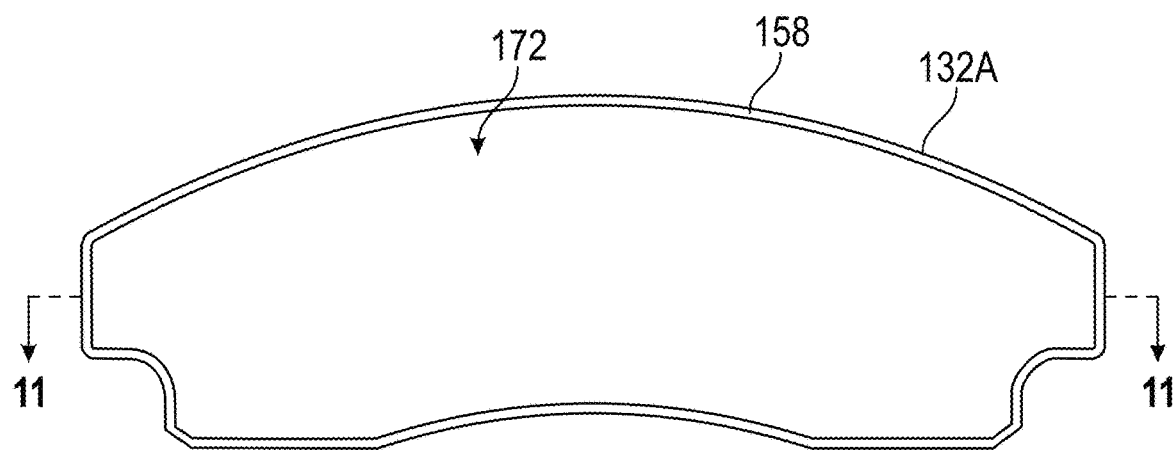
FIG. 10 is an elevation view of the shim of FIG. 9.
Figure 11:
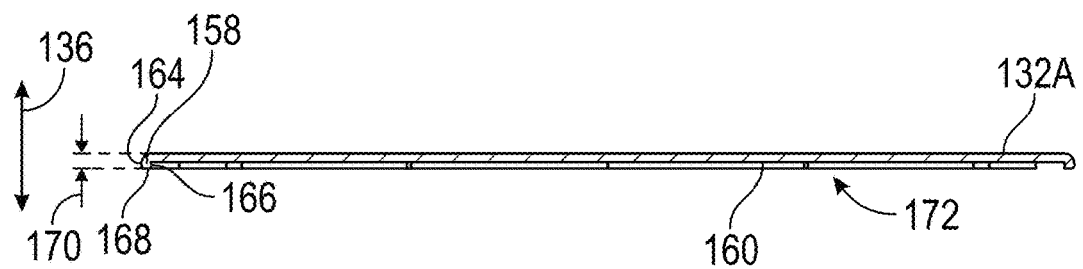
FIG. 11 is a section view taken along line 11-11 of FIG. 10.

Referring now to FIGS. 9-11, the outer shim 132A is illustrated in detail. The outer shim 132A has a lip or cup portion 158 extending outward from a shim surface 160. The lip 158 extends circumferentially about the shim surface 160—i.e., the lip 158 extends 360° on the shim surface 160. As such, the shim surface 160 forms a second recessed portion or pocket, indicated generally at 162 on the shim surface 160. When the outer brake pad 102A is assembled, the second recessed portion 162 faces the outer backing plate 128A. As a non-limiting example, the lip 158 may define an extent of contact between the outer shim 132A and the outer backing plate 128A along the second axis 152.

Preferably, the lip 158 has a shape or other arrangement that is complementary to a shape or other arrangement of the groove 142. Preferably, the lip 158 is formed during a stamping operation that forms the outer shim 132A from a suitable material. Alternatively, the lip 158 may be formed other than during a stamping operation. Preferably, the outer shim 132A is formed from a metallic material such as steel or aluminum. Alternatively, the outer shim may be formed from other types of material that provide damping. As a non-limiting example, the outer shim 132A may be cast from a rubber material.

The lip 158 has a first or outer face surface 164, a second or inner face surface 166, and a center surface 168 spanning between the outer and inner lip face surfaces 164 and 166, respectively. The lip 158 has a lip height 170 along the axis 136 from the shim surface 160. As such, the outer shim 132A and the lip 158 have a greater combined thickness than the outer shim 132A alone. Preferably, the lip height 170 is constant for an entirety of the lip 158. Alternatively, the lip height 170 may vary. Preferably, the groove depth 154 is greater than the lip height 170.

The outer and inner lip face surfaces 164 and 166, respectively, are transverse to the groove bottom surface 146. Preferably, the outer and inner lip face surfaces 164 and 166, respectively, are parallel to the axis 136 and thus perpendicular to the groove bottom surface 146. Preferably, the outer and inner lip face surfaces 164 and 166, respectively, are parallel to the outer and inner groove perimeter surfaces 148 and 150, respectively. Alternatively, when the outer and inner lip face surfaces 164 and 166, respectively, are not parallel to the outer and inner groove perimeter surfaces 148 and 150, respectively, the outer lip face surface 164 and outer groove perimeter surface 148 preferably both have complementary shapes to each other and the inner lip face surface 166 and the inner groove perimeter surface 150 also preferably both have complementary shapes to each other.

The shim surface 160 has a portion surrounded by the lip 158. As illustrated, an entirety of the shim surface 160 is surrounded by the lip 158 although such is not necessary. The portion of the shim surface 160 surrounded by the lip 158 is a contact area, indicated generally at 172. As will be discussed, the shim contact area 172 is for securing the outer shim 132A to the outer backing plate 128A.

As illustrated, the outer shim 132A has a single layer of shim material. Alternatively, the outer shim 132A may comprise multiple, stacked, bonded layers of shim material.

Figure 12:
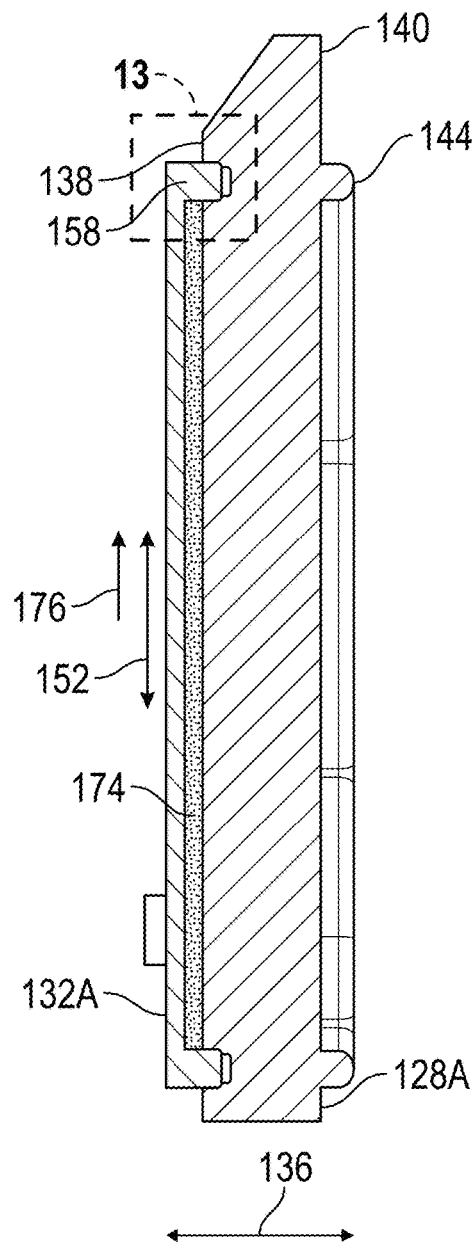
FIG. 12 is a section view of the brake pad of FIG. 1.
Figure 13:
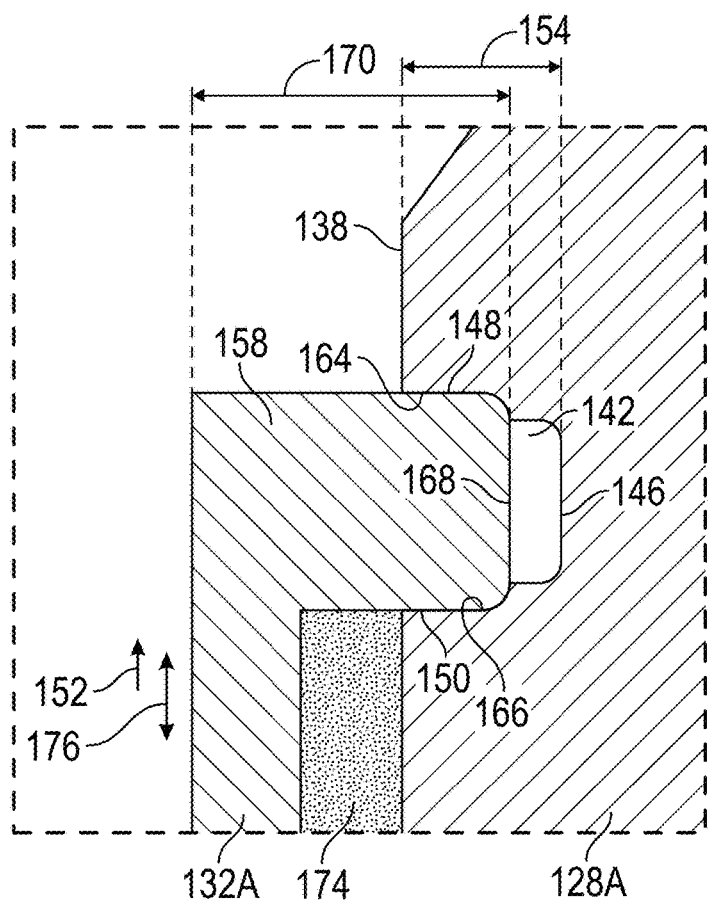
FIG. 13 is an enlarged portion of FIG. 12.
Figure 14:
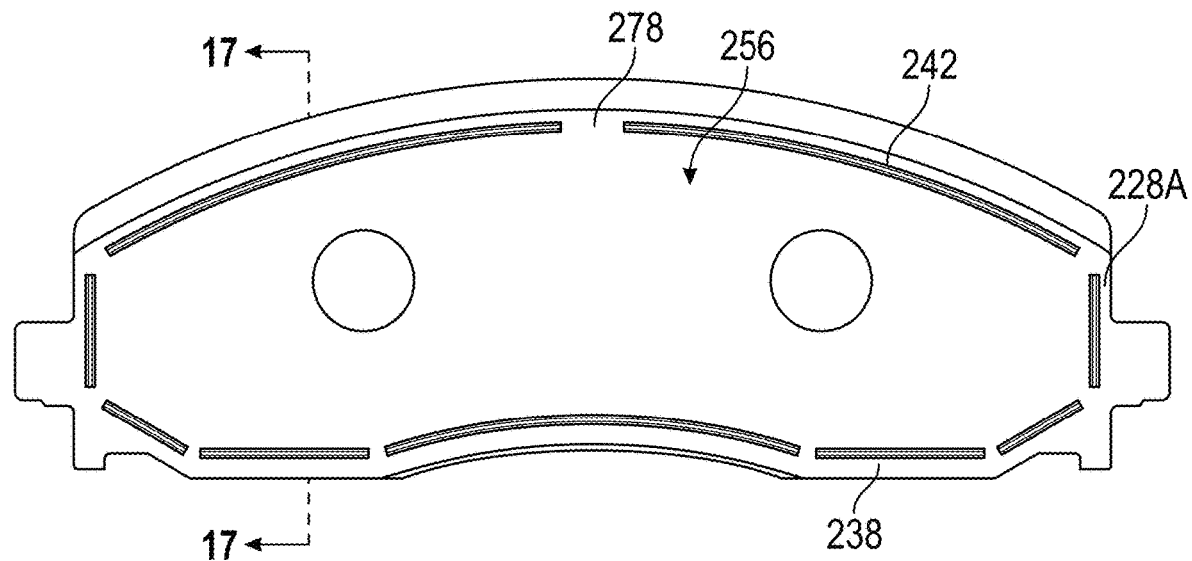
FIG. 14 is a first elevation view of a backing plate of a brake pad in accordance with a second embodiment of the present invention.
Figure 15:
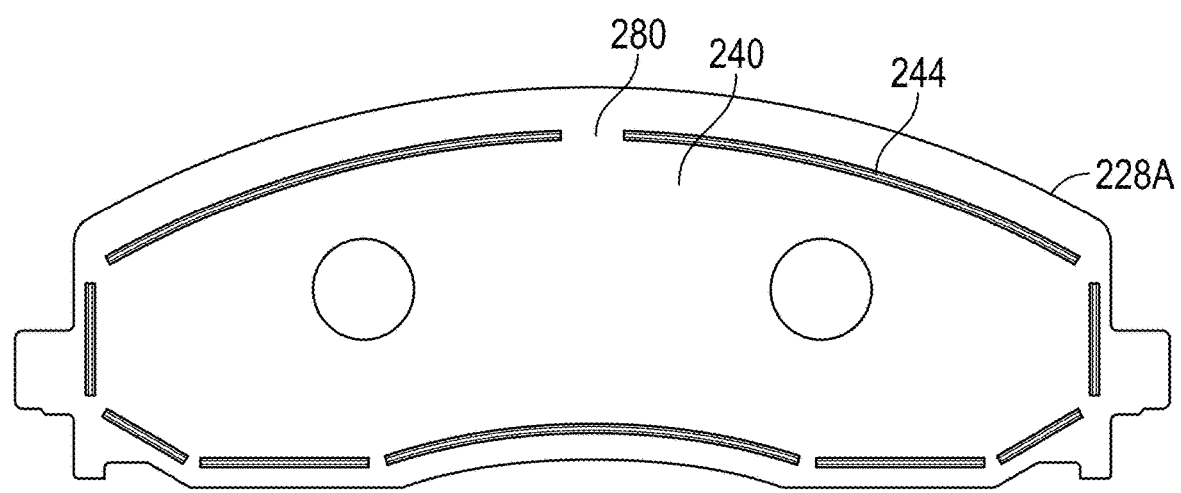
FIG. 15 is a second elevation view of the backing plate of FIG. 14.
Figure 16:
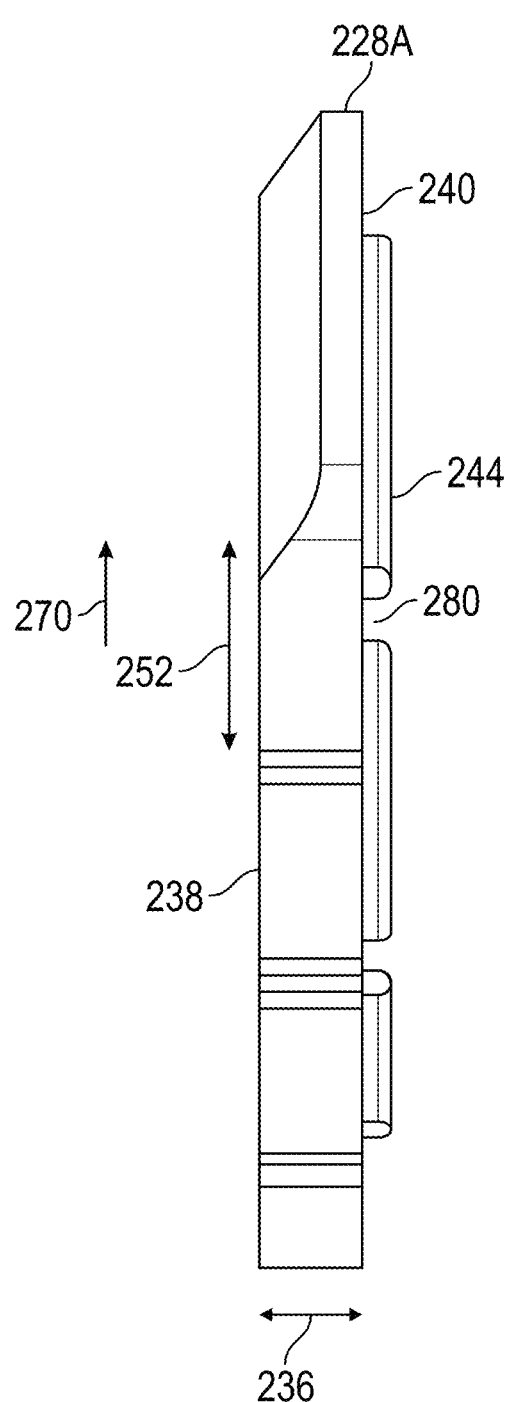
FIG. 16 is a third elevation view of the hacking plate of FIG. 14.
Figure 17:
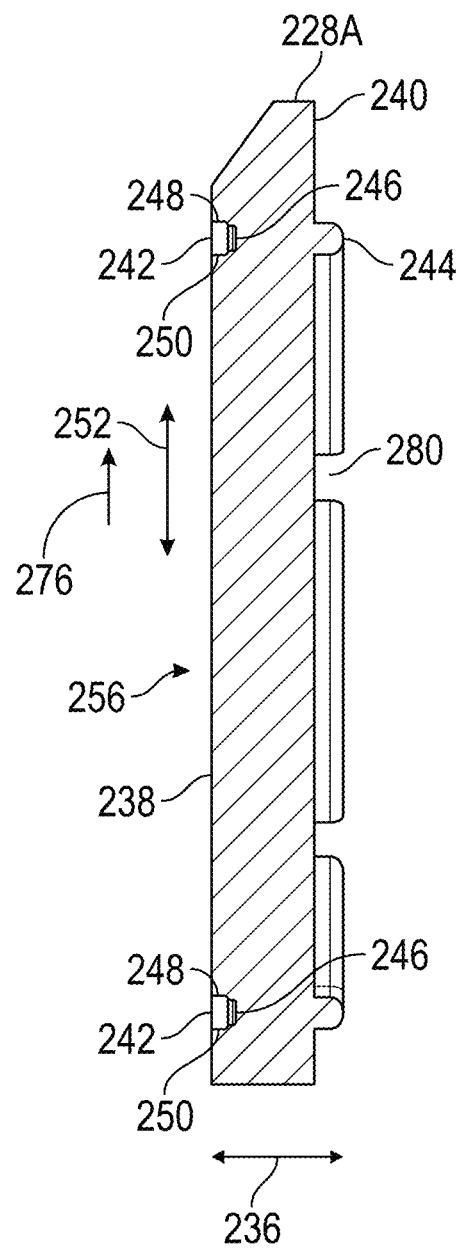
FIG. 17 is a section view taken along line 17-17 of FIG. 14.
Figure 18:
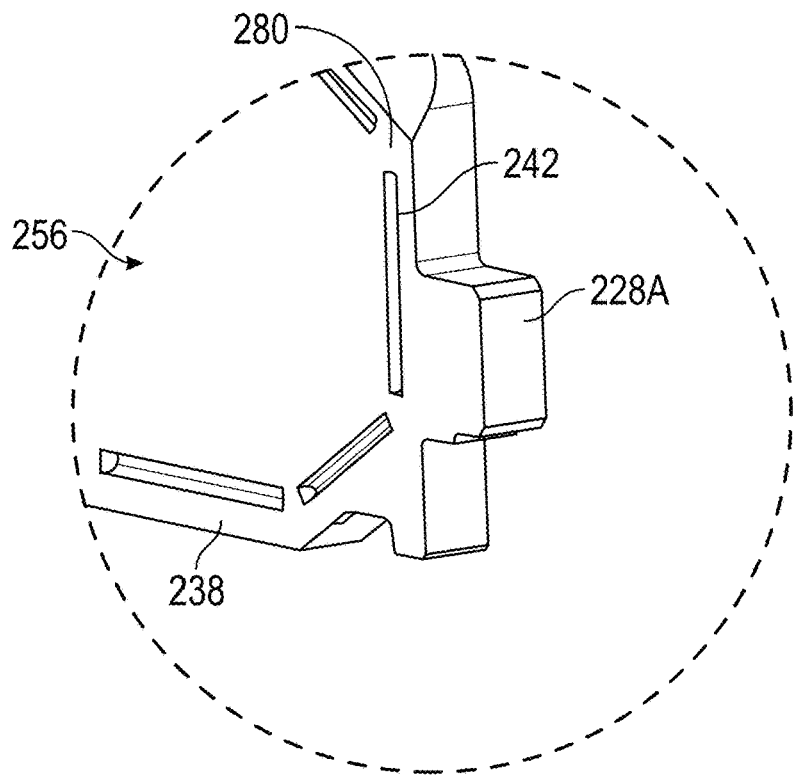
FIG. 18 is a partial perspective view of the backing plate of FIG. 14.

Referring now to FIGS. 12 and 13, there is illustrated the outer shim 132A secured to the outer backing plate 128A. The outer shim 132A is secured to the outer backing plate 128A by an adhesive that forms an adhesive bond 174 between the outer backing plate 128A and the outer shim 132A to secure or otherwise retain the outer shim 132A to the outer backing plate 128A. Preferably, the adhesive bond 174 is between the backing plate contact area 156 and the shim contact area 172. After adhesive is placed on one or both of the backing plate contact area 156 and the shim contact area 172, the outer shim 132A and the outer backing plate 128A are brought together until tight with the lip 158 inserted in the groove 142. Adhesive may also be placed in the groove 142. Furthermore, the lip 158 retains the adhesive for the adhesive bond 174 within an area defined by the inner lip face surface 166.

Preferably, the backing plate contact area 156 and the shim contact area 172 are equal in size. Alternatively, the backing plate contact area 156 may be greater in size than the shim contact area 172—e.g., there may be a space, clearance, or other tolerance between the outer lip face surface 164 and the outer groove perimeter surface 148 and/or the inner lip face surface 166 and the inner groove perimeter surface 150.

As the outer shim 132A and outer backing plate 128A are brought together until tight, the lip 158 is inserted in the groove 142. As the lip 158 is inserted in the groove 142, the outer lip face surface 164 engages with the outer groove perimeter surface 148 and the inner lip face surface 166 engages with the inner groove perimeter surface 150. The outer lip face surface 164 being engaged with the outer groove perimeter surface 148 and the inner lip face surface 166 being engaged with the inner groove perimeter surface 150 mechanically restrain the outer shim 132A from lateral displacement or other movement along the second axis 152. More broadly, the outer shim 132A is mechanically restrained from lateral displacement in a plane containing the second axis 152.

As a non-limiting example, the outer shim 132A may be urged to laterally displace along the second axis 152 when subjected to a force 176 acting along the second axis 152. The force 176 is produced during operation of the disc brake assembly 100. The force 176 is not limited to the direction shown. The force 176 may be in any direction perpendicular to the axis 136.

The force 176 along the second axis 152 further engages the outer lip face surface 164 with the outer groove perimeter surface 148 and the inner lip face surface 166 with the inner groove perimeter surface 150. Alternatively, only the outer lip face surface 164 may engage with the outer groove perimeter surface 148 or only the inner lip face surface 166 may engage with the inner groove perimeter surface 150 to mechanically restrain the outer shim 132A from lateral displacement along the second axis 152.

Alternatively, the outer lip face surface 164 may not engage with the outer groove perimeter surface 148 and the inner lip face surface 166 may not engage with the inner groove perimeter surface 150 when the lip 158 is inserted in the groove 142. When the outer lip face surface 164 does not engage with the outer groove perimeter surface 148 and the inner lip face surface 166 does not engage with the inner groove perimeter surface 150 when the lip 158 is inserted in the groove 142, the outer lip face surface 164 instead engages with the outer groove perimeter surface 148 and/or the inner lip face surface 166 instead engages with the inner groove perimeter surface 150 when the outer shim 132A is displaced along the second axis 152 by the force 176.

As can be seen in FIGS. 12 and 13, the groove depth 154 is greater than zero for less than an entirety of an area where the outer shim 132A contacts the outer backing plate 128A. Specifically, and as discussed, the groove depth 154 is zero in the backing plate contact area 156.

Referring now to FIGS. 14-21, there is illustrated an outer backing plate 228A and an outer shim 232A for a brake pad in accordance with a second embodiment of the present invention. The outer backing plate 228A and the outer shim 232A are a variation of the outer backing plate 128A and the outer shim 132A of FIGS. 1-13. As such, like reference numerals, increased by 100, designate corresponding parts in the drawings and detailed description thereof will be omitted.

Referring specifically to FIGS. 14-18, groove notches 278 define a groove 242 as a plurality of separate groove portions—i.e., the groove 278 is not continuous about a first face 238 of the outer backing plate 228A. Preferably, the groove notches 278 are positioned to reduce stress concentrations in the outer backing plate 228A. A first face 238 is continuous and not recessed at the groove notches 278. Similarly, rib notches 280 define a rib 244 as a plurality of separate rib portions—i.e., the rib 244 is also not continuous about a second face 240 of the outer backing plate 228A. Preferably, the rib notches correspond to locations of the groove notches 278.

Figure 19:
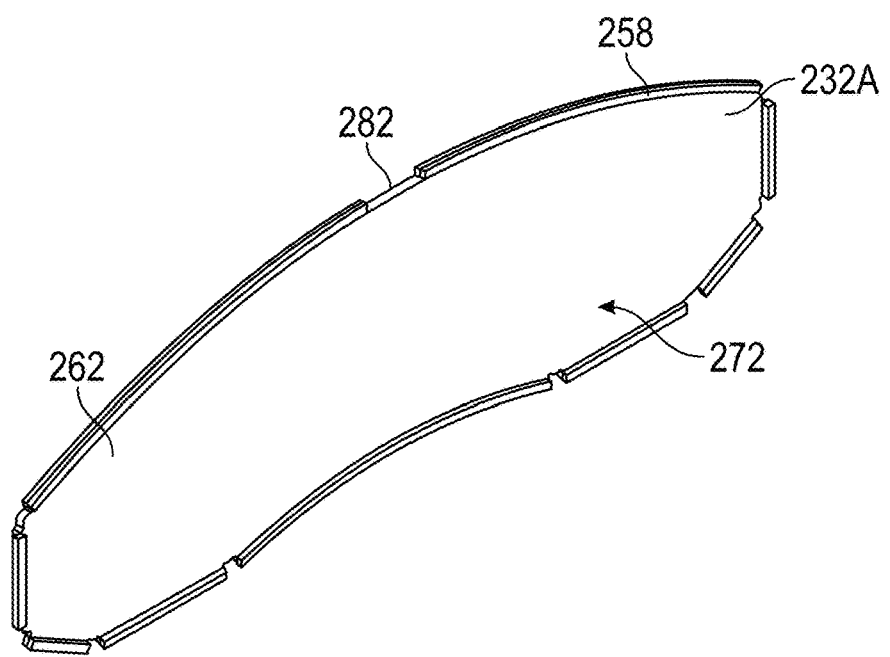
FIG. 19 is a perspective view of a shim of the brake pad in accordance with the second embodiment of the present invention.
Figure 20:
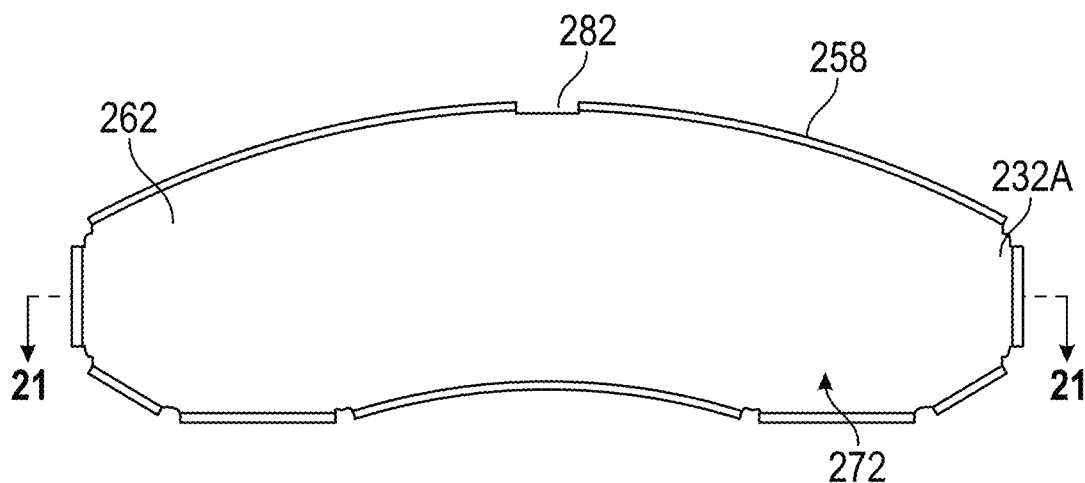
FIG. 20 is an elevation view the shim of FIG. 19.
Figure 21:
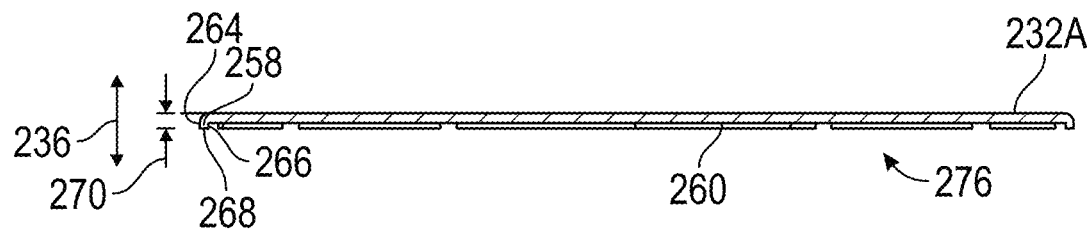
FIG. 21 is a section view taken along line 21-21 of FIG. 20.
Figure 22:
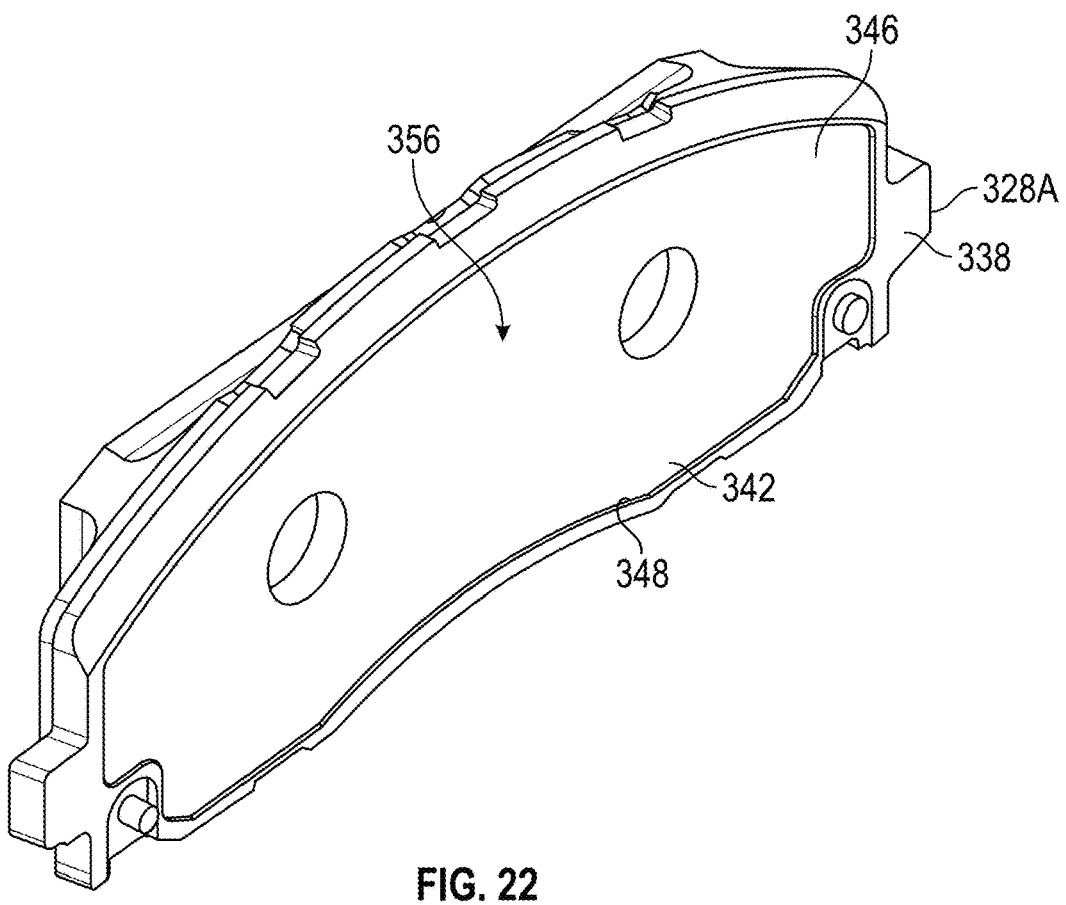
FIG. 22 is a first perspective view of a brake pad in accordance with a third embodiment of the present invention.
Figure 23:
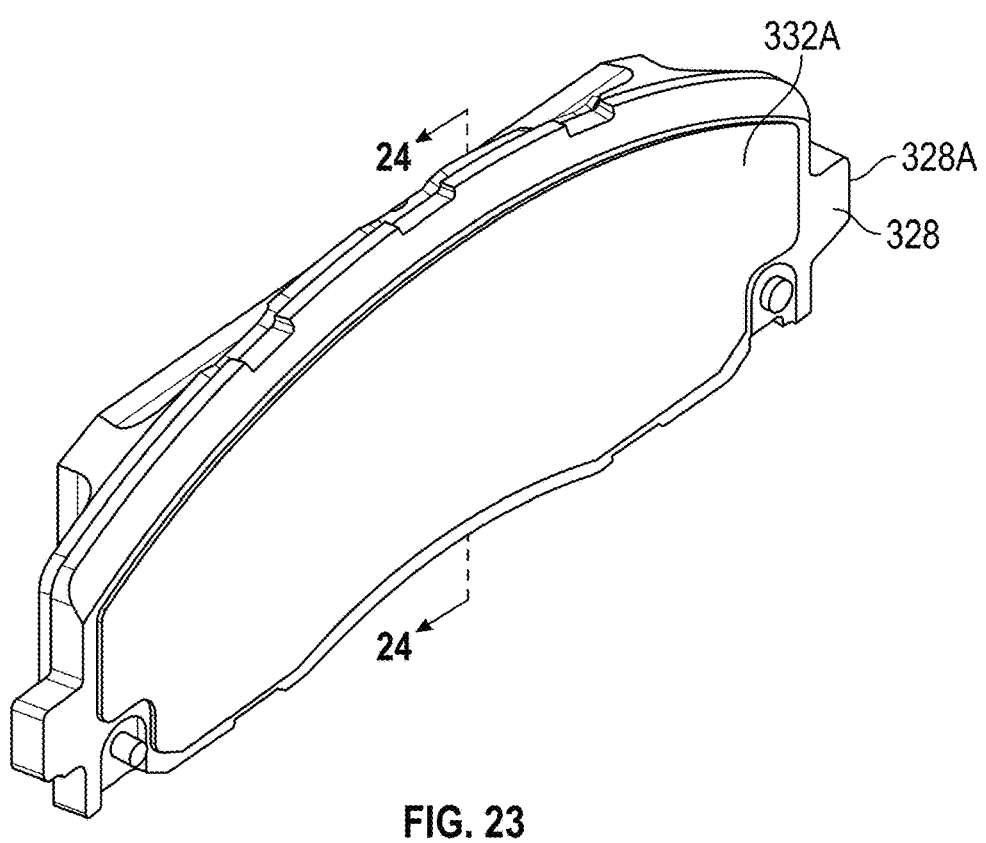
FIG. 23 is a second perspective view of the brake pad of FIG. 22.
Figure 24:
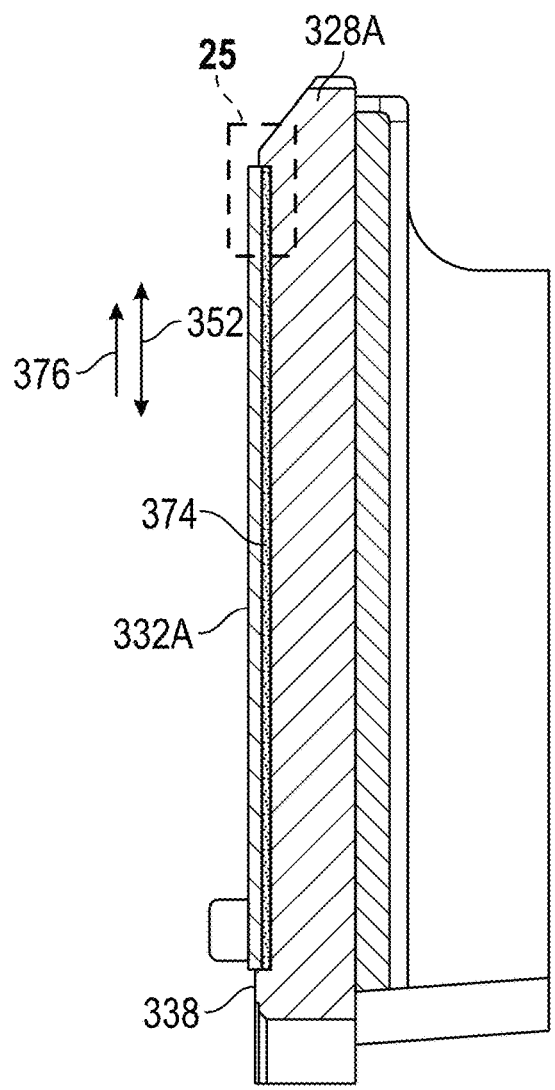
FIG. 24 is a section view taken along line 24-24 of FIG. 23.
Figure 25:
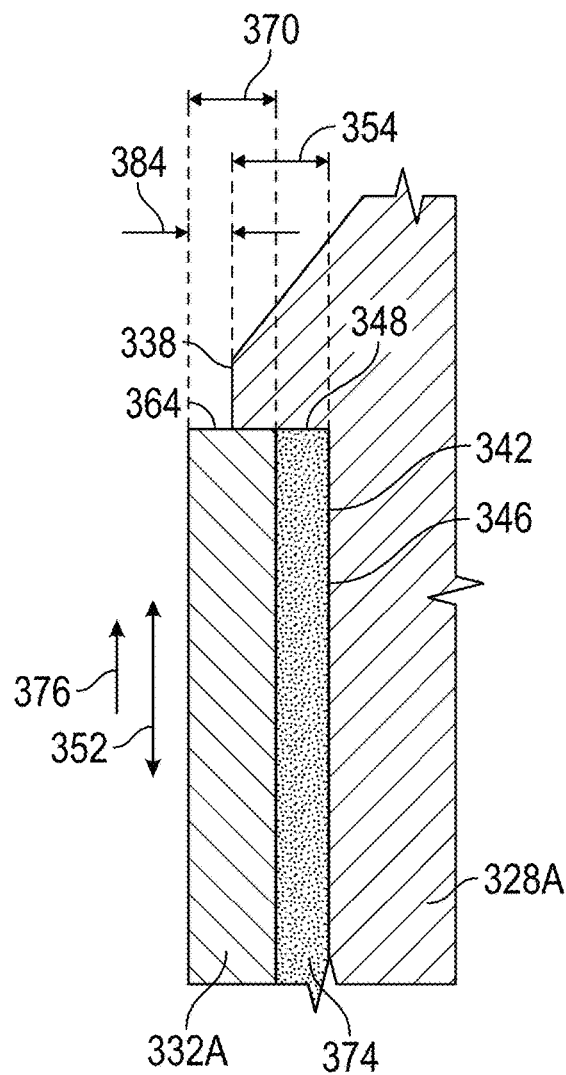
FIG. 25 is an enlarged portion of FIG. 24.

Referring specifically to FIGS. 19-21, lip notches 282 define a lip 258 as a plurality of separate lip portions—i.e., the lip 258 is not continuous about the shim face 260. Preferably, the lip notches 282 are positioned to reduce stress concentrations in the outer shim 232A. The outer shim 232A is preferably used with the outer backing plate 228A of FIGS. 14-18.

Referring now to FIGS. 22-25, there is illustrated an outer backing plate 328A for a brake pad in accordance with a third embodiment of the present invention. The outer backing plate 328A is a variation of the outer backing plate 128A of FIGS. 1-13. As such, like reference numerals, increased by 200, designate corresponding parts in the drawings and detailed description thereof will be omitted.

An outer backing plate 328A has a recessed portion 342. As a non-limiting example, the recessed portion 342 in FIGS. 22-25 is a pocket. The pocket 342 has a first bottom surface 346 and an outer perimeter surface 348. The pocket 342 does not have an inner perimeter surface and, as such, a first face 338 of the outer backing plate 328A does not have an "island" or panel as does the outer backing plate 128A of FIGS. 1-13. For all of a contact area, indicated generally at 356, a depth 354 is greater than zero—i.e., an entirety of the contact area 356 extends inward into the first backing plate face 338.

The outer brake pad 302A further has a planar outer shim 332A. The planar outer shim 332A does not have a lip or cup portion. Instead, a body of the planar outer shim 332A has an outer face surface 364. As a non-limiting example, the planar outer shim 332A may be a prior art shim known to those skilled in the art.

As illustrated, the pocket 342 has a single depth 354 and the planar outer shim 332A has a single height 370. Alternatively, the pocket 342 may have multiple depths 354 and the outer shim 332A may have corresponding multiple heights 370 such that the pocket 342 is non-planar and the outer shim 332A has a shape complementary to the non-planar pocket 342.

As illustrated, the planar outer shim 332A in the pocket 342 protrudes or otherwise extends a distance 384 outward from the first face 338. Alternatively, when placed in the pocket 342, the planar outer shim 332A may be flush with the first face 338—i.e., the distance 384 may be zero. A full extent of the planar outer shim 332A along a second axis 352 is within the pocket 342.

The outer face surface 364 engages with or otherwise contacts an outer perimeter surface 348 to mechanically restrain the planar outer shim 332A in the pocket 342 from lateral displacement along a second axis 352. Furthermore, the pocket 342 retains adhesive for an adhesive bond 374 between the planar outer shim 332A and the outer backing plate 328A.

Figure 26:
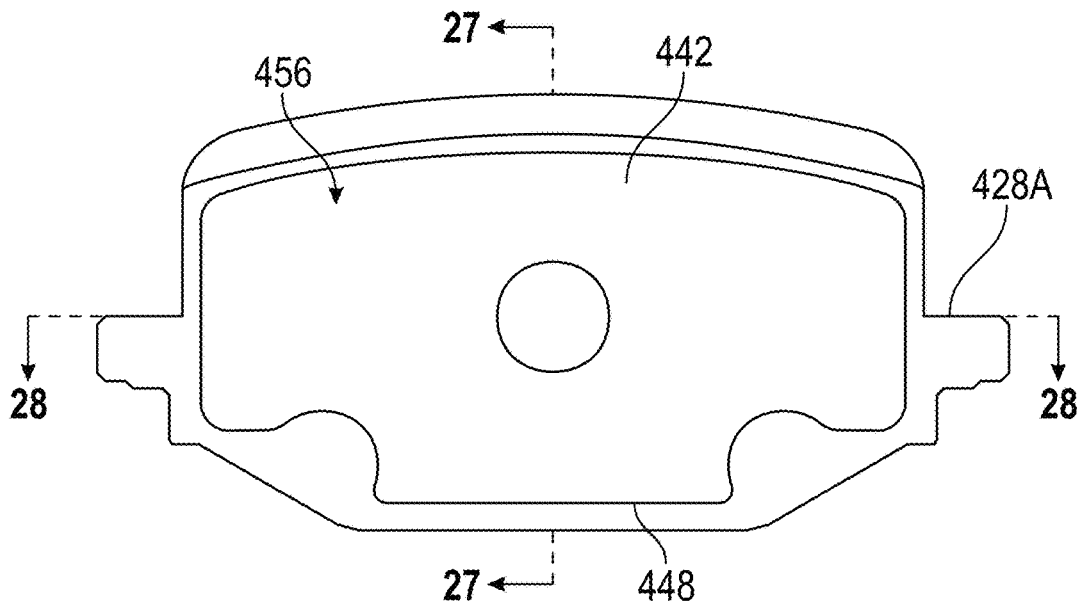
FIG. 26 is an elevation view of a brake pad in accordance with a fourth embodiment of the present invention.
Figure 27:
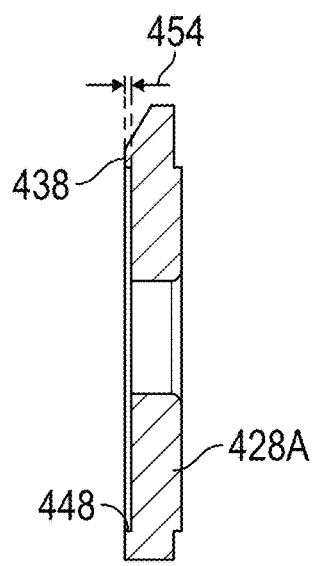
FIG. 27 is a section view taken along line 27-27 of FIG. 26.
Figure 28:
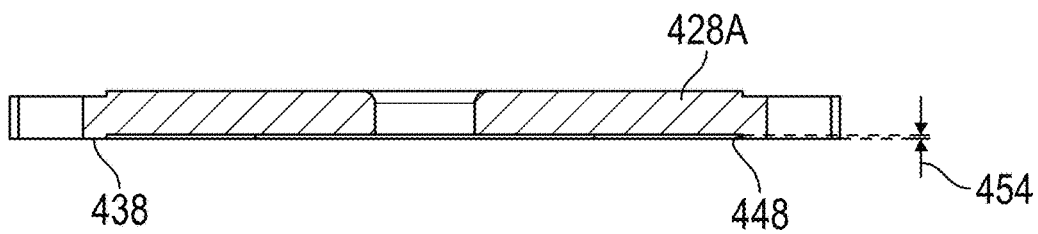
FIG. 28 is a section view taken along line 28-28 of FIG. 26.
Figure 29:
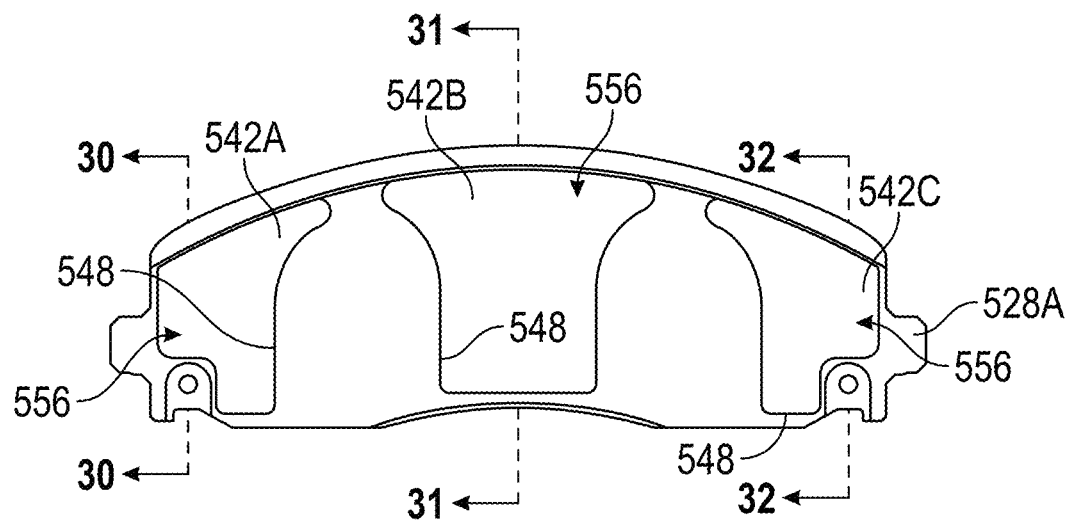
FIG. 29 is an elevation view of a brake pad in accordance with a fifth embodiment of the present invention.
Figure 30:
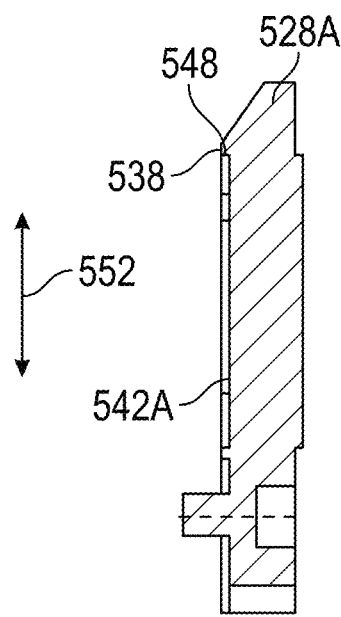
FIG. 30 is a section view taken along line 30-30 of FIG. 29.
Figure 31:
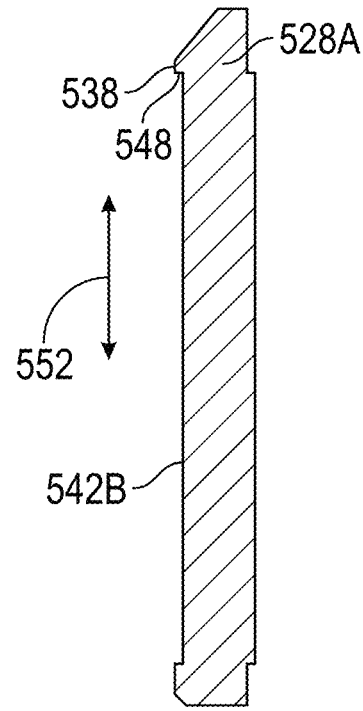
FIG. 31 is a section view taken along line 31-31 of FIG. 29.
Figure 32:
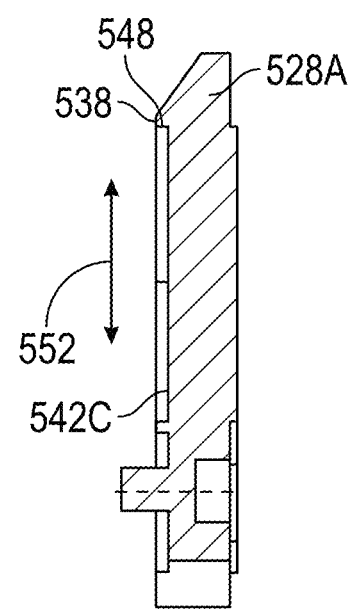
FIG. 32 is a section view taken along line 32-32 of FIG. 29.

Referring now to FIGS. 26-28, there is illustrated an outer backing plate 428A for a brake pad in accordance with a fourth embodiment of the present invention. The outer backing plate 428A is a variation of the outer backing plate 128A of FIGS. 1-13. As such, like reference numerals, increased by 300, designate corresponding parts in the drawings and detailed description thereof will be omitted.

As a non-limiting example, the outer backing plate 428A may be used with a vehicle disc brake assembly having a single piston.

Referring now to FIGS. 29-32, there is illustrated an outer backing plate 528A for a brake pad in accordance with a fifth embodiment of the present invention. The outer backing plate 528A is a variation of the outer backing plate 128A of FIGS. 1-13. As such, like reference numerals, increased by 400, designate corresponding parts in the drawings and detailed description thereof will be omitted.

The outer backing plate 528A locates first, second, and third recessed portions 542A, 542B, and 542C, respectively, to correspond to locations of fingers of a caliper. More or less than the illustrated first, second, and third recessed portions 542A, 542B, and 542C, respectively, may be provided to correspond to a quantity of the fingers.

Shims in each of the first, second, and third recessed portions 542A, 542B, and 542C, respectively, may vary in thickness. As a non-limiting example, a shim in the center second recessed portion 542B may be thicker than shims in the outer first and third recessed portions 542A and 542C, respectively. To accommodate shims of different thicknesses, the first, second, and third recessed portions 542A, 542B, and 542C respectively, may have different depths. As a non-limiting example, the depths of the first, second, and third recessed portions 542A, 542B, and 542C respectively, may be set so that the different thickness shims all extend an equal distance from a first face 538 of the outer backing plate 528A when installed in the outer backing plate 528A.

Figure 33:
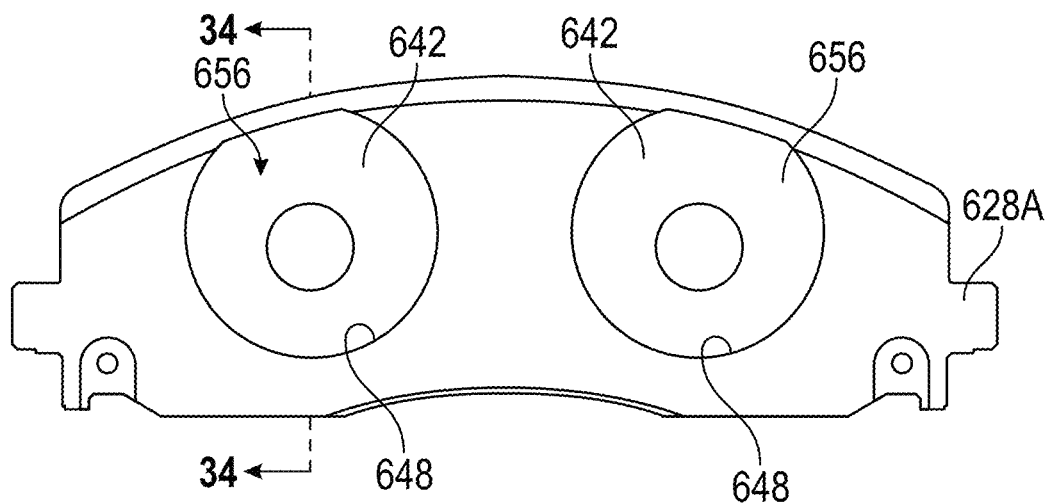
FIG. 33 is an elevation view of a brake pad in accordance with a sixth embodiment of the present invention.
Figure 34:
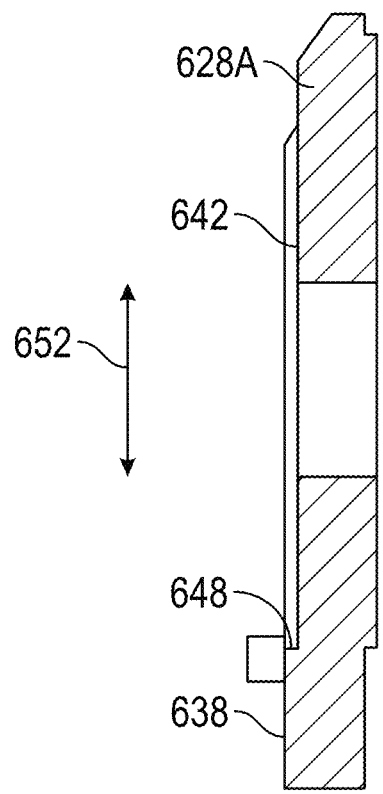
FIG. 34 is a section view taken along line 34-34 of FIG. 33.

Referring now to FIGS. 33 and 34, there is illustrated an outer backing plate 628A for a brake pad in accordance with a sixth embodiment of the present invention. The outer backing plate 628A is a variation of the outer backing plate 128A of FIGS. 1-13. As such, like reference numerals, increased by 500, designate corresponding parts in the drawings and detailed description thereof will be omitted.

The outer backing plate 628A locates recessed portions 642 to correspond to locations of brake pistons.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A brake pad for a vehicle disc brake assembly, the brake pad comprising:
   a backing plate configured to support a brake lining and having a recessed portion with transverse first and second surfaces, wherein the first surface is a bottom surface of the recessed portion and the second surface is a perimeter surface that defines a perimeter of the bottom surface;
   a metal shim having a face surface that is transverse to the bottom surface; and
   an adhesive bond between the backing plate and the shim that retains the shim on the backing plate, wherein the face surface is configured to engage with the perimeter surface to mechanically restrain the shim in the recessed portion.

2. The brake pad of claim 1 further comprising:
a third surface of the backing plate into which the recessed portion extends; and
a depth between the first and third surfaces, wherein the depth is perpendicular to the first surface and greater than zero for all of an area where the shim contacts the backing plate.

3. The brake pad of claim 1 further comprising:
a third surface of the backing plate into which the recessed portion extends; and
a depth between the first and third surfaces, wherein the depth is perpendicular to the first surface and greater than zero for less than all of an area where the shim contacts the backing plate.

4. The brake pad of claim 1 further comprising:
a third surface of the shim, wherein the face surface is a lip extending from the third surface such that the shim has a second recessed portion facing the backing plate.

5. The brake pad of claim 4 wherein the brake pad is configured to be displaced along a first axis and the lip defines an extent of contact between the shim and the backing plate along a second axis that is perpendicular to the axis.

6. The brake pad of claim 4 further comprising:
inner and outer surfaces of the lip, wherein the face surface is the outer surface and the perimeter surface is an outer perimeter of the recessed portion.

7. The brake pad of claim 4 further comprising:
inner and outer surfaces of the lip, wherein the face surface is the inner surface and the perimeter surface is an inner perimeter of the recessed portion.

8. The brake pad of claim 4 further comprising:
at least one notch in the lip, wherein the at least one notch in the lip defines a plurality of lip portions; and
at least one notch in the recessed portion, wherein the at least one notch in the recessed portion defines a plurality of notch portions.

9. The brake pad of claim 4 further comprising:
a rib on a face of the backing plate opposite the recessed portion.

10. The brake pad of claim 9 further comprising:
at least one notch in the rib, wherein the at least one notch in the rib defines a plurality of rib portions.

11. The brake pad of claim 1 wherein the face surface engages with the second surface when the face surface displaces towards the perimeter of the bottom surface during operation of the disc brake assembly.

12. A brake pad for a vehicle disc brake assembly, the brake pad comprising:
a backing plate configured to support a brake lining and be displaced along a first axis, wherein the backing plate has a recessed portion with a bottom surface and a second surface that defines a perimeter of the bottom surface;
a metal shim having a face surface that is transverse to the bottom surface; and
an adhesive bond between the backing plate and the shim that retains the shim on the backing plate, wherein the face surface engages with the second surface when the shim displaces along a second axis perpendicular to the first axis.

13. The brake pad of claim 12 further comprising:
a third surface of the backing plate into which the recessed portion extends;
a portion of the backing plate that is coplanar with the third surface, wherein the bottom surface extends circumferentially around the coplanar portion;
a fourth surface of the shim facing the third surface; and
a lip extending from the fourth surface, wherein the face surface is on the lip.

14. The brake pad of claim 12 further comprising:
a depth of the recessed portion, wherein the second surface defines an outer perimeter of the recessed portion and the depth within the outer perimeter is greater than zero.

15. The brake pad of claim 12 further comprising:
inner and outer perimeters of the recessed portion, wherein the second surface is the outer perimeter;
a depth of the recessed portion, wherein the depth is greater than zero between the inner perimeter and the outer perimeter; and
an area within the inner perimeter that is not recessed.

16. A brake pad for a vehicle disc brake assembly, the brake pad comprising:
a backing plate configured to support a brake lining and be displaced along a first axis, wherein the backing plate has a recessed portion with a bottom surface perpendicular to the first axis and a perimeter surface transverse to the bottom surface;
a metal shim, wherein at least a portion of the shim is in the recessed portion and the shim has a face surface that is complementary to the perimeter surface; and
an adhesive bond between the backing plate and the shim that secures the shim to the recessed portion, wherein the face surface is configured to engage with the perimeter surface and mechanically restrain the shim on the backing plate when the shim is subjected to a force along a second axis perpendicular to the first axis.

17. The brake pad of claim 16 wherein the recessed portion is a groove and the portion of the shim in the recessed portion is a lip extending from the shim and having the face surface.

18. The brake pad of claim 16 wherein the recessed portion is a pocket and a full extent of the shim along the second axis is in the pocket.

* * * * *